April 16, 1957 H. W. NORDYKE, JR 2,789,026
ERROR SENSING ARRANGEMENT FOR MAGNETIC WRITING DEVICES
Filed Oct. 30, 1953
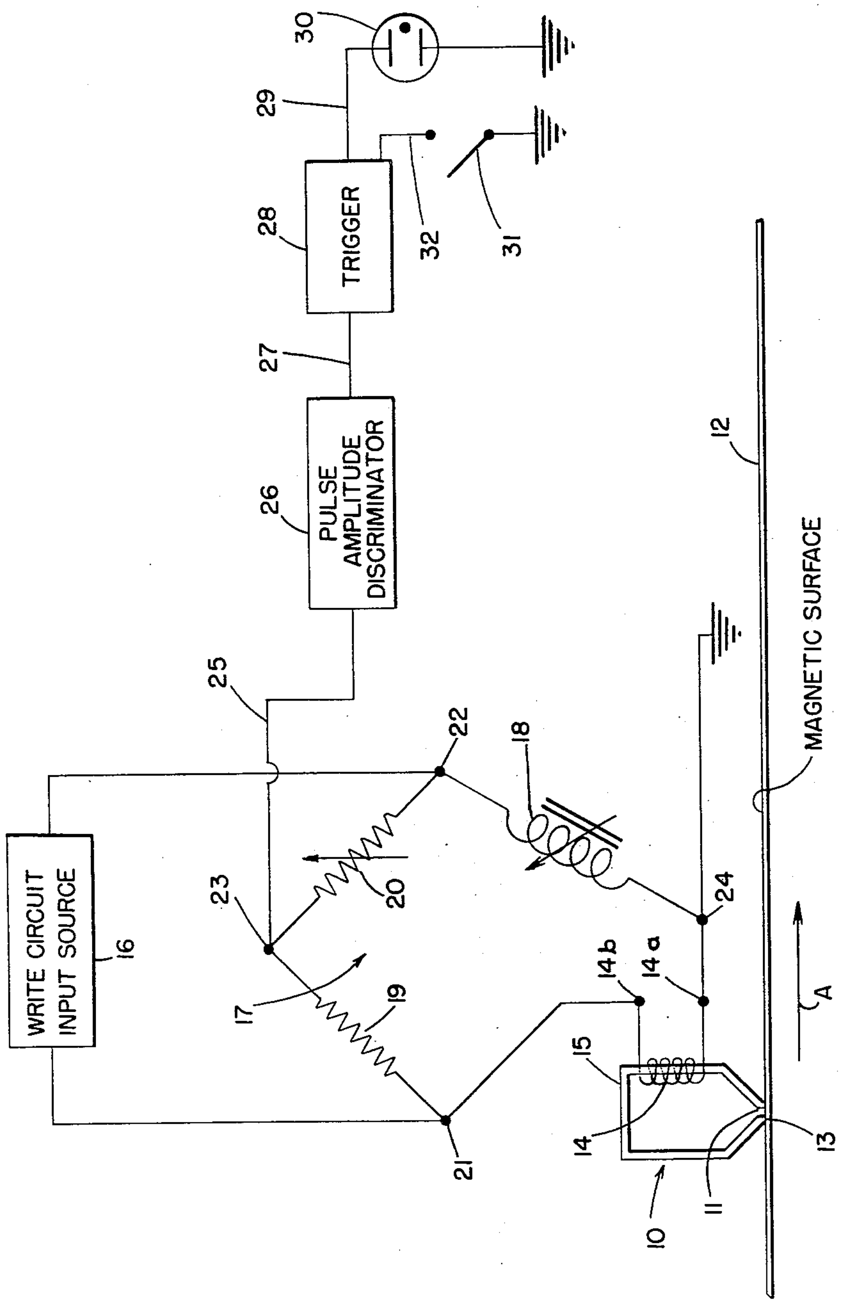
*INVENTOR.*
HORACE W. NORDYKE, JR.
*BY*
Kenyon & Kenyon
ATTORNEYS United States Patent Office 2,789,026

Patented Apr. 16, 1957

2,789,026

ERROR SENSING ARRANGEMENT FOR MAGNETIC WRITING DEVICES

Horace W. Nordyke, Jr., Titusville, Poughkeepsie, N. Y., assignor to International Business Machines Corporation, New York, N. Y., a corporation of New York Application October 30, 1953, Serial No. 389,359

10 Claims. (Cl. 346—74)

This invention relates to magnetic spot writing devices which write information in the form of magnetic spots on magnetic surfaces provided on tapes or drums, and more particularly to circuits for writing said spots which include error sensing arrangements that detect and signal errors in spot writing occurring during writing and which are occasioned, for example, by loss of proper writing contact between the magnetic surface on which spot writing is being effected and the magnetic spot writing head which is doing the writing.

Magnetic spots are often recorded on magnetic surfaces provided by metallic tape or metallic drums, or by iron oxide tapes having paper or plastic backings. In most storage recordings of this type a magnetic spot written or stored on the magnetic surface has a definite significance. The loss of any one such spot in a group recorded on the magnetic surface will change the identity of the recorded information on said surface. A magnetic spot could be lost if, during the magnetic writing process, the magnetic surface passing in contact with the writing head at the instant of delivery of a magnetic spot recording pulse to the head were accidentally separated from the writing surface of the head far enough so that the spot recording flux from the head did not penetrate the moving magnetic surface at all or else did not penetrate sufficiently. Another possible cause of loss of any particular spot would be a magnetic defect in the magnetic recording surface appearing directly under the head writing surfaces at the instance a spot writing flux pulse is being delivered by the head. Causes for separation of the magnetic surface from the head could be accumulated dust or dirt on the magnetic surfaces of tapes or drums or variations in the density of the magnetic oxide layers of the tape when such oxide layer tapes are used. Moreover separation of magnetic surfaces of tape from the head could also result from tape vibrations caused by frayed tape edges. Any separation of the magnetic surface from contact with the writing surface of the head at the instant a flux spot writing pulse is being delivered by the head will result either in entire failure of recording on the magnetic surface of the particular spot or else the improper recording of such a spot. As a result of either occurrence the composite record in a group of spots intended to be written or recorded upon the magnetic surface will be at variance with the desired recorded information and therefore inaccurate.

In conventional magnetic spot writing heads, an air gap is provided in the laminated core of the writing head adjacent the writing surfaces of the latter. The magnetic surface upon which magnetic spots are to be applied or written by the writing head is moved in contact with the writing surfaces of the head and in bridging relationship across the air gap. If the bridging relation at the air gap is disturbed by a separation of the magnetic surface from the writing surfaces of the head in any of the ways mentioned above, the air gap changes and as a result the reluctance at said air gap changes. This change in reluctance at the air gap results in a change in the effective inductance of the energizing coil of the writing head when looking into the terminals of said coil. In other words, the effective inductance of the coil is a function of the reluctance at the air gap. In the present invention, the change in effective inductance of the coil of the writing head is utilized in conjunction with an electric circuit to provide an error signal voltage pulse that will be transmitted by the circuit and utilized to indicate that a writing error has occurred on the magnetic surface. The error signal pulse transmitted in the electric circuit may be utilized to operate sensing means such as a signal light to provide a visual indication of the occurrence of the writing error, or the error signal pulse may be utilized in other ways as will be presently described.

A primary object of the invention is to provide means for writing spot information on a magnetic surface and to provide an error sensing arrangement in conjunction with the spot writing means which will render an indication that a spot recording error has occurred during actual spot writing on the magnetic surface. The invention is particularly advantageous in the transfer of card recorded information to magnetic surfaces, because transfer errors in the form of incorrectly written magnetic spots are sensed immediately and can be corrected as they occur.

Other objects and features of the invention are to provide a circuit arrangement utilizing an alternating current bridge circuit in conjunction with the energizing coil of the writing head which bridge circuit is normally balanced when proper spot writing is being effected on the magnetic surface, and which becomes unbalanced to provide an error signal voltage pulse when any change in air gap reluctance occurs for any of the reasons hereinbefore mentioned, and to provide sensing or detecting means connected to said bridge circuit which utilizes each error signal pulse occurring to inform the operator of the writing device of spot writing errors as they occur during spot writing.

Further objects and features of the invention are to provide discriminating means to prevent improper operation of said sensing or detecting means as the result of spurious signal pulses that may occur and which are not the result of the actual occurrence of a spot writing error.

Other objects and features of the invention are the provision of error detecting arrangements and circuits that may be connected for use in conjunction with conventional magnetic spot writing heads without requiring any changes in their construction or in the structural features of writing or recording machines in which the writing heads are employed.

Further objects and features of the invention are the provision of error detecting arrangements and circuits that are relatively simple to install and operate and which are effective for the intended purposes.

Other objects and features of the invention will become apparent from the following specification and the accompanying drawing wherein the figure illustrates diagrammatically an electric circuit embodying the invention as it is utilized in conjunction with a conventional single winding magnetic spot writing head of a magnetic spot recording device.

Referring to the drawing, the spot writing head 10 is of conventional construction and has an air gap 11 past which a magnetic surface 12 such as that on a tape or drum is moved for recording of magnetic spots thereon. For accurate spot recording on the magnetic surface 12, the surface must bridge the air gap 11 and make contact with the writing head tip surfaces 13 at said gap 11.

The magnetic surface 12 is moved past the writing head tip surfaces 13, for example, in the direction of the arrow A by any conventional means.

A write coil 14 on the laminated core 15 of the writing head 10 is used to energize the head 10 from a conventional write circuit input source 16 which is connected to said coil 14 as will be presently described. This source 16 in conventional way provides spot recording voltage pulses as directed by conventional coding arrangements. Each voltage pulse from the source 16 energizes the coil 14 to cause the head 10 to deliver a spot writing flux pulse to the magnetic surface in contact with the head tip surfaces 13 at the instance that the flux pulse occurs.

An error detecting arrangement comprising an alternating current Wheatstone bridge circuit 17 is provided. One of the arms or elements of this bridge circuit 17 consists of the writing head coil 14, and the bridge circuit 17 includes this coil 14 by connection to its terminals 14*a* and 14*b*. The other arms or elements of the bridge circuit 17 are respectively the variable inductance 18, the fixed resistor 19 and the variable resistor 20. The write circuit input source 16 is connected to the oppositely located bridge circuit junction points 21, 22 so that voltage pulses from said source 16 supply the necessary energizing pulses to the coil 14 of the writing head 10 for magnetic spot writing by the latter on the magnetic surface 12, as a result of the flux pulses appearing at the writing head tip surfaces 13 adjacent air gap 11.

It is intended that the bridge circuit 17 will be balanced with respect to the reluctance value at the air gap 11 when proper contact exists between the magnetic surface 12 and the tip surfaces 13, and when there are no defects in said magnetic surface. At such time the effective inductance of coil 14 has a determined value, and the bridge circuit 17 is balanced by adjustment of the variable inductance 18 and the variable resistor 20. The variable inductance 18 is adjustable relative to the said determined value of the effective inductance of coil 14 and the variable resistor 20 is adjustable relative to the fixed resistor 19 of the bridge circuit 17 for bridge circuit balancing purposes. When the bridge circuit 17 is in balance, application of voltage pulses from the write circuit input source 16 to the bridge junction points 21, 22 will provide necessary energization of the write coil 14 for magnetic spot recording on the magnetic surface 12 in contact with the tip surfaces 13. When said bridge circuit 17 is in balance zero voltage or potential exists between the pair of oppositely located bridge circuit junction points 23 and 24 even while write voltage pulses from source 16 are being transmitted to bridge junction points 21 and 22 and to write coil 14. However, any unbalancing of the bridge circuit results in the appearance of a voltage or potential pulse between the oppositely located bridge circuit junction points 23 and 24.

Automatic unbalancing of the bridge circuit 17 occurs whenever the reluctance of air gap 11 is changed by a separation of the magnetic surface 12 from the tip surfaces 13. This change in air gap reluctance alters the effective inductance of write coil 14 giving it a different value from the said determined value to which the bridge circuit 17 has been balanced. The change in air gap reluctance signifies that a false spot recording or writing has occurred on the magnetic surface. Thus if the bridge circuit 17 has been balanced to provide zero voltage across junction points 23 and 24 while "true" spot information is being recorded on the magnetic surface, automatic bridge circuit unbalancing caused by writing of false or erroneous spot information results in the appearance of a voltage or potential pulse across junction points 23 and 24. For convenience this voltage or potential pulse is hereinafter called "error signal" voltage pulse. This error signal voltage pulse is utilized to operate an error sensing arrangement in an electric circuit, for example, as follows:

Bridge junction point 23 is connected by connector 25 to the input side of a conventional pulse amplitude discriminator 26 for purposes to be presently described. Bridge junction point 24 is grounded.

The output of the pulse amplitude discriminator 26 is connected by connector 27 to the normally non-conducting side of a conventional cross-coupled triode trigger 28. The output from the normally conducting side of the trigger 28 is connected as by wire 29 to one element of the neon lamp or glow discharge tube 30 whose other element is grounded. A normally open trigger reset switch 31 having one contact grounded and its other contact connected to the trigger 28 by wire 32 functions in usual way to reset the trigger 28 whenever desired.

Operation of the circuit arrangements is as follows:

With writing potential applied from the write circuit input source 16 across bridge circuit points 21 and 22 and with a portion of the magnetic surface known to be free of defect in contact with the recording tip surfaces 13 of the writing head 10 and bridging its air gap 11, the variable resistor 20 and the variable inductance 18 are adjusted to provide for zero voltage across the bridge junction points 23, 24 so that the bridge circuit 17 is in balance.

Recording of magnetic spots by the writing head 10 on the magnetic surface is now undertaken in usual way with the magnetic surface 12 moving past the writing head surfaces 13 and in bridging relationship across its air gap 11. The write voltage pulses delivered from the source 16 thus apply successively located magnetic spots on the moving magnetic surface 12. As long as defect-free magnetic surface remains in contact with the writing head tip surfaces 13 while write pulses are being delivered to the bridge circuit 17, the latter remains balanced and no error signal voltage exists across the junction points 23 and 24. No error signal voltage is transmitted in the electric circuit connected to these points.

If now at any time the magnetic surface 12 of the moving tape or drum is separated in any way from contact with the writing head tip surfaces 13 at the air gap 11, the reluctance of said air gap 11 is changed. A defect in the magnetic surface will also change the reluctance of said air gap 11. The change in reluctance changes the effective inductance of the writing head coil 14 when looking into its terminals 14*a*, 14*b*. Since the effective inductance appearing between terminals 14*a* and 14*b* thus is changed, the effective impedance of coil 14 is also changed. Since the coil 14 is one of the arms or elements of the bridge circuit 17 which has been balanced to the original inductance value of said coil 14, the bridge circuit 17 now becomes unbalanced. This unbalancing of the bridge circuit 17 causes a voltage or potential pulse to appear across the bridge junction points 23, 24. This voltage or potential across terminals 23, 24 is the hereinbefore described error signal voltage pulse.

This error signal voltage pulse is transmitted from the point 23 via connector 25 to the input side of the pulse amplitude discriminator 26, and after passing through the discriminator 26 is delivered from the latter via connector 27 to the ordinarily non-conducting side of the trigger 28, thus rendering that side conducting and rendering the ordinarily conducting or output side of the trigger 28 non-conducting. When the output side of the trigger 28 is thus made non-conducting, the neon light 30 which is connected thereto by wire 29 and to the junction point 24 through ground glows giving a visual error signal. This visual signal at the neon light 30 indicates that a magnetic spot writing error has occurred on the magnetic surface 12 moving past the writing head tip surfaces 13 at the instant that a particular write voltage pulse was delivered to writing head 10 from the source 16 due to changed reluctance of the air gap 11 of the head 10 caused by separation of magnetic surface 12 from tip surfaces 13 due to any one of the reasons hereinbefore mentioned. The operator then knows that the error must be corrected and after error correction has been made resets trigger 28 by momentarily closing trigger reset switch 31.

The function of pulse amplitude discriminator 26 is to prevent spurious voltage pulses appearing across junction points 23, 24 from actuating the trigger 28 and the neon light 30. Such spurious voltage pulses may appear across the junction points 23, 24 of the bridge circuit 17 during writing on the magnetic surface 12 as a result of time-lag in the build-up of current in the inductances of the bridge circuit or in the form of noise voltage pulses. However created, these spurious voltage pulses have a different and smaller amplitude than those of actual error signal voltage pulses which are intended to actuate the neon light 30 to denote improper spot writing on the magnetic surface and which have been produced by an unbalancing of the bridge circuit 17 as the result of change in reluctance at the air gap 11. The discriminator 26 passes only true error signal voltage pulses whose amplitudes are greater than a predetermined threshold value and which value is greater than that of any spurious voltage pulse amplitudes however created. The discriminator 26 thus insures arrival at the trigger 28 only of "true" error signal voltage pulses. The discriminator 26 in effect blocks out all spurious voltage pulses thus preventing them from operating the trigger 28 to illuminate the neon light 30.

While the instant application discloses the use of a neon light as the visual error signal detector, lighting of which is effected by the appearance of an error signal voltage pulse across the bridge circuit junction points 23 and 24, it is to be understood that these junction points 23 and 24 could be connected to other circuits so that error signal voltage pulses appearing across said points could actuate other sensing arrangements such as control circuits and mechanism to stop the recording machine, or mechanisms that would cause rewriting of the information on the magnetic surface 12.

In the embodiment shown and by way of example only, the elements or arms of the bridge circuit 17 have the following values. Inductance of write coil 14 at balance is approximately 12 millihenries. Fixed resistor 19 has a value of 720 ohms. Variable resistor 20 is a 1000 ohm potentiometer. Variable inductance 26 is variable in the 12 millihenry range. It is understood, however, that the element values given are in no sense limiting. As is well known in bridge theory, any element values that will produce desired balance of the bridge circuit shown and described herein may be selected.

Also, while the bridge circuit 17 shown utilizes resistors and inductances in its arms or elements, individual bridge circuit arms or elements may be changed, for example, to capacitances or other impedances as long as the fundamental concepts of alternating current bridge theory are retained and with which balancing of the bridge circuit is possible in relationship to the write coil 14 and to the non-linear characteristics of the writing head 10 for the intended purposes.

A material advantage of the arrangement herein described is that writing error detection occurs during actual writing of the magnetic information on the magnetic surface. As a result error correction can be made promptly as it occurs.

While a specific embodiment of the invention has been disclosed, variations in detail within the scope of the appended claims are possible and are contemplated. There is no intention therefore of limitation to the exact details shown and described.

What is claimed is:

1. An error sensing arrangement for a magnetic surface writing device comprising an energizing coil for said device, supply means for providing energizing voltage pulses to said coil, an alternating current bridge circuit connected to said coil and to said supply means and including said coil as one of its bridge elements, means for balancing said bridge circuit with respect to said coil, sensing means, and an electric circuit connected to a pair of junction points of said bridge circuit and to said sensing means to transmit to said sensing means any voltage pulses appearing across said junction points whenever said bridge circuit becomes unbalanced because of a change of effective inductance of said coil and thereby to operate said sensing means.

2. A writing error detector arrangement for a magnetic surface writing device, comprising an energizing coil for said device, voltage supply means connected to said coil for providing energizing voltage pulses thereto, an alternating current bridge circuit connected to said voltage supply means and to said coil to include said coil as one of its bridge elements, other bridge elements in said bridge circuit for balancing said bridge circuit across a pair of bridge circuit junction points, sensing means, an electric circuit connected to said junction points and to said sensing means and discriminator means in said electric circuit to transmit to said sensing means voltage pulses above a determined threshold amplitude appearing across said junction points whenever said bridge circuit becomes unbalanced because of a change in the effective inductance of said coil and thereby to operate said sensing means.

3. An error sensing arrangement for a magnetic surface writing device comprising an energizing coil for said device, supply means for providing energizing voltage pulses to said coil, an alternating current bridge circuit connected to said coil and to said supply means and including said coil as one of its bridge elements, means for balancing said bridge circuit with respect to said coil to provide zero voltage at balance across a pair of bridge circuit junction points, sensing means, and an electric circuit connected to said junction points and to said sensing means to transmit to said sensing means any voltage pulses appearing across said junction points whenever said bridge circuit becomes unbalanced because of a change of effective inductance of said coil and thereby to operate said sensing means.

4. A writing error detector arrangement for a magnetic surface writing device, comprising an energizing coil for said device, voltage supply means connected to said coil for providing energizing voltage pulses thereto, an alternating current bridge circuit connected to said voltage supply means and to said coil to include said coil as one of its bridge elements, other bridge elements in said bridge circuit for balancing said bridge circuit to provide zero voltage at bridge balance across a pair of bridge circuit junction points, sensing means, an electric circuit connected to said junction points and to said sensing means and discriminator means in said electric circuit to transmit to said sensing means voltage pulses above a determined threshold amplitude appearing across said junction points whenever said bridge circuit becomes unbalanced because of a change in the effective inductance of said coil and thereby to operate said sensing means.

5. In combination with a magnetic surface writing device wherein a magnetic surface is moved in surface contact with a magnetic writing head having an air gap and wherein a coil is utilized to energize the head for spot writing of magnetic information on said surface, an error detecting arrangement for indicating improperly written magnetic information on said magnetic surface comprising an alternating current bridge circuit one of whose arms consists of the said coil, means for balancing said bridge circuit relative to said coil to provide zero potential across a pair of points of said bridge circuit while magnetic information is being properly written on said magnetic surface, said bridge circuit becoming unbalanced whenever inductance of the coil changes as a result of a change in reluctance of the air gap and thereby producing an error potential across said pair of points, and an electric detector circuit connected across said pair of points and including a signal operated by transmission to it of said error potential by said detector circuit.

6. In combination, a magnetic writing head having an air gap, a magnetic surface movable in contact with said head and across said air gap, a writing head energizing coil whose effective inductance is controlled by air gap reluctance, means for supplying write energizing voltage pulses to said coil, an alternating current bridge circuit including said coil as one of its elements, means to balance said bridge circuit to produce zero potential across a pair of its junction points at that value of effective inductance of said coil occurring during true spot writing contact between said magnetic surface and said head relative at said air gap, said air gap reluctance being changed by any contact separation of said magnetic surface from said head and thereby changing said effective inductance of said coil and unbalancing said bridge circuit, and the unbalancing of said bridge resulting in the appearance of an error voltage across said points, and circuit means connected to said points of said bridge circuit for utilizing said error voltage to provide detection of a writing error made on said magnetic surface whenever said magnetic surface is separated from the head.

7. In combination, a magnetic writing head coil whose effective inductance depends upon reluctance of a write head air gap, an alternating current bridge circuit connected to said coil to include it as an element of said bridge circuit, means to balance said bridge circuit for a determined effective inductance of said coil thereby providing zero potential across a pair of bridge circuit junction points at bridge circuit balance, sensing means, and an electric circuit connected to said sensing means and to said junction points for transmitting voltages appearing across said pair of junction points to said sensing means whenever the bridge circuit becomes unbalanced as a result of a change in reluctance of the air gap.

8. In combination, a magnetic writing head coil whose effective inductance changes in accord with changes in the reluctance of a write head air gap, an alternating current bridge circuit connected to said coil so as to include it as an element of said bridge circuit, means to balance said bridge circuit for a determined effective inductance value of said coil to provide zero potential across a pair of bridge circuit junction points at bridge balance, sensing means, an electric circuit connected to said sensing means and to said junction points for transmitting voltages appearing across said pair of junction points to said sensing means whenever the bridge circuit becomes unbalanced as a result of a change in reluctance of the air gap, and discriminating means in said electric circuit to prevent operation of said sensing means by any voltages in said electric circuit not caused by unbalancing of said bridge circuit as the result of a change in air gap reluctance.

9. In magnetic spot information writing apparatus wherein magnetized spots are written upon a magnetized surface passing in contact with a magnetic writing head having an air gap whose reluctance changes upon separation of the contact between the magnetic surface and the writing head, a coil for energizing said head for writing spots on said surface and whose effective inductance is a function of the reluctance of the air gap, an alternating current bridge circuit connected to said coil to include the latter as one element of the bridge circuit, means for balancing said bridge circuit with respect to the effective inductance of said coil when the air gap reluctance value is that occurring when proper spot writing contact exists between the magnetic surface and the writing head, said bridge circuit having a pair of bridge junction points that are at zero potential when the bridge circuit is balanced and across which points writing error signalling voltages appear when the bridge becomes unbalanced as a result of change in effective inductance of said coil, said change in effective inductance being effected by change in reluctance at the air gap caused by any contact separation between the magnetic surface and the writing head sufficient to cause improper spot writing on said surface, sensing means, and an electric circuit connected to said sensing means and to said bridge circuit junction points for transmitting error signalling voltages appearing at said junction point through said electric circuit to said sensing means to actuate the latter.

10. In magnetic spot information writing apparatus wherein magnetized spots are written upon a magnetized surface passing in contact with a magnetic writing head having an air gap whose reluctance changes upon separation of contact between the magnetic surface and the writing head, a coil for enregizing said head for writing spots on said surface and whose effective inductance is a function of the reluctance of the air gap, an alternating current bridge circuit connected to said coil to include the latter as one element of the bridge circuit, means for balancing said bridge circuit with respect to the effective inductance of said coil when the air gap reluctance value is that occurring when proper spot writing contact exists between the magnetic surface and the writing head, said bridge circuit having a pair of bridge junction points that are at zero potential when the bridge circuit is balanced and across which points writing error signalling voltages appear when the bridge is unbalanced as a result of change in inductance of said coil, said change in effective inductance being effected by change in reluctance at the air gap caused by contact separation between the magnetic surface and the writing head sufficient to cause improper spot writing on said surface, sensing means, an electric circuit connected to said sensing means and to said bridge circuit junction points for transmitting error signalling voltages appearing at said junction points through said electric circuit to said sensing means to actuate the latter, and voltage amplitude discriminating means in said electric circuit to prevent any voltages other than error signalling voltages appearing in said electric circuit from actuating said sensing means.

References Cited in the file of this patent

FOREIGN PATENTS 693,664 Germany ______________ July 16, 1940